United States Patent
Cook et al.

(10) Patent No.: US 9,294,490 B1
(45) Date of Patent: Mar. 22, 2016

(54) APPARATUS AND METHOD FOR IDENTIFYING A DOMAIN NAME SYSTEM RESOURCE EXHAUSTION ATTACK

(71) Applicant: Cloudmark, Inc., San Francisco, CA (US)

(72) Inventors: Neil Cook, Somerset (GB); Olivier Lemarié, Sunnyvale, CA (US); Aaron Alexander Lehmann, San Francisco, CA (US)

(73) Assignee: Cloudmark, Inc., San Francisco, CA (US)

( * ) Notice: Subject to any disclaimer, the term of this patent is extended or adjusted under 35 U.S.C. 154(b) by 0 days.

(21) Appl. No.: 14/508,953

(22) Filed: Oct. 7, 2014

(51) Int. Cl.
*H04L 29/06* (2006.01)

(52) U.S. Cl.
CPC ........ *H04L 63/1416* (2013.01); *H04L 63/1458* (2013.01)

(58) Field of Classification Search
CPC ................. H04L 63/1416; H04L 63/1458
USPC .......................................................... 726/23
See application file for complete search history.

(56) References Cited

U.S. PATENT DOCUMENTS

| | | | |
|---|---|---|---|
| 7,620,989 B1* | 11/2009 | Couturier | H04L 12/2697 726/22 |
| 2006/0218304 A1* | 9/2006 | Mukherjee | G06F 17/30902 709/246 |
| 2007/0107059 A1* | 5/2007 | Chasin | H04L 63/126 726/23 |
| 2008/0028463 A1* | 1/2008 | Dagon | H04L 29/12066 726/22 |
| 2008/0028467 A1* | 1/2008 | Kommareddy | H04L 63/1458 726/23 |
| 2011/0185425 A1* | 7/2011 | Lee | H04L 29/12066 726/23 |
| 2012/0151593 A1* | 6/2012 | Kang | H04L 41/142 726/25 |
| 2013/0085914 A1* | 4/2013 | McPherson | H04L 61/1511 705/34 |
| 2013/0198065 A1* | 8/2013 | McPherson | H04L 61/1511 705/40 |
| 2015/0089645 A1* | 3/2015 | Vandergeest | G06F 21/54 726/23 |
| 2015/0106870 A1* | 4/2015 | Li | H04L 63/1425 726/1 |
| 2015/0150123 A1* | 5/2015 | Be'ery | H04L 63/1416 726/22 |

\* cited by examiner

*Primary Examiner* — Michael S McNally
(74) *Attorney, Agent, or Firm* — Cooley LLP

(57) ABSTRACT

A machine includes a processor and a memory connected to the processor. The memory stores instructions executed by the processor to identify a resource attack in response to spikes in the number of unique subdomains being queried and spikes in the number of timeouts or delayed responses from a specified name server.

7 Claims, 3 Drawing Sheets

APPARATUS AND METHOD FOR IDENTIFYING A DOMAIN NAME SYSTEM RESOURCE EXHAUSTION ATTACK

FIELD OF THE INVENTION

This invention relates generally to traffic processing in computer networks. More particularly, this invention relates to techniques for identifying a domain name system resource exhaustion attack.

BACKGROUND OF THE INVENTION

The Domain Name System (DNS) is a hierarchical distributed naming system for devices connected to the Internet or a private network. The DNS translates easily memorized domain names to the numerical IP addresses needed to locate devices. For example, the domain name www.example.com translates to the addresses 93.184.216.119 (IPv4) and 2606:2800:220:6d:26bf:1447:1079:aa7 (IPv6).

A domain name comprises one or more parts, called labels, which are concatenated and delimited by dots. For the domain www.example.com, the right-most label expresses the top-level domain; in this case the top-level domain is "com". The hierarchy moves from right to left. Each label to the left specifies a subdomain of the domain to the right. Relying upon the same example, the label "example" is a subdomain of the "com" domain, while "www" is a subdomain of "examples.com". Subdomains may have up to 127 levels.

The DNS may be used for nefarious purposes. Consider network 100. An attack machine 101 operates as a command and control center for a coordinated attack. In particular, the attack machine 101 uses network 102 to access a set of compromised machines 104_1, 104_2 through 104_N. Machine 104_N resides in a local network infrastructure 106 (e.g., an Internet Service Provider or ISP). An open resolver 107 and name server 108 also reside in the network 106. Network 106 is connected to another network 110, which is coupled to a name server 112, which is an authoritative name server. The authoritative name server 112 is responsible for supported domains. The authoritative name server 112 may delegate authority over subdomains to other name servers, such as recursive name server 108. The open resolver 107 may also be used to support subdomains.

The compromised machines 104 form a botnet, which the attack machine 101 coordinates to send a flood of requests to the recursive name server 108 of network 106. Additionally the attacker may flood requests through the open resolver 107. Each request contains a unique, randomized, and non-existent subdomain of a previously registered domain (e.g., kbsruxixqfwww.examples.com, adujqzutahyp.www.examples.com). Because of the uniqueness of the subdomains, each request will then trigger a recursive lookup against the domain's name server. As the attack grows in numbers, the amount of requests hitting the intended target's DNS resolver infrastructure grows as well. Eventually the target's DNS resolver infrastructure buckles under the load, either from system resource depletion, network saturation, or both.

A major source of DNS infrastructure abuse comes from open resolvers (e.g., 107) residing within an ISP's network (e.g., 106). Open resolvers are typically commodity devices used for home networking that are misconfigured to allow access from outside the local network. These devices are independently managed and are often running out of date firmware with known exploits. This is a difficult problem for ISPs to address because they have limited control, if any, over these devices, and no way to separate legitimate from malicious traffic.

The other major source of abuse comes from compromised machines 104. Compromised machines are costly to remediate, and ISPs are hesitant to take broader action for fear of upsetting their customers.

In view of the foregoing, it would be desirable to establish techniques for identifying DNS resource exhaustion attacks.

SUMMARY OF THE INVENTION

A machine includes a processor and a memory connected to the processor. The memory stores instructions executed by the processor to identify a resource attack in response to spikes in the number of unique subdomains being queried and spikes in the number of timeouts or delayed responses from a specified name server.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

The present invention identifies anomalous behavior such as spikes in the number of unique subdomains being queried and spikes in the number of timeouts or delayed responses from a given name server. Counter-measures may then be enacted to respond to the anomalous behavior.

Figure 1:
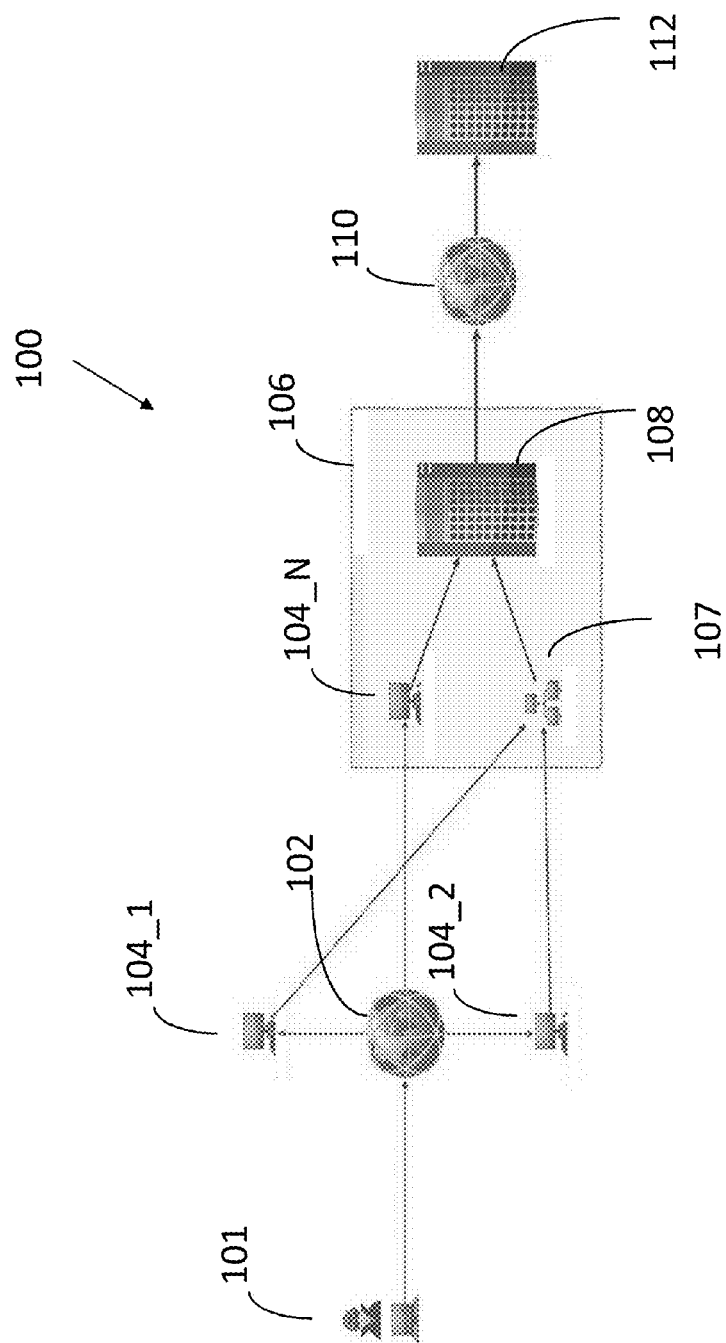
FIG. 1 illustrates a prior art network susceptible to DNS resource exhaustion attacks.
Figure 2:
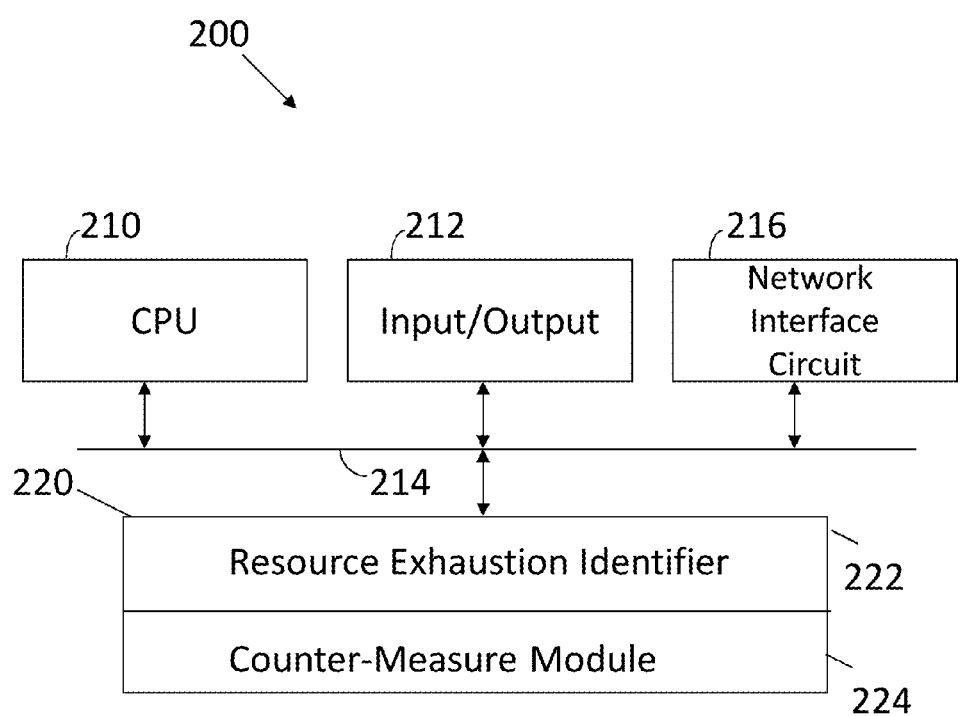
FIG. 2 illustrates a machine configured in accordance with an embodiment of the invention.

FIG. 2 illustrates a machine 200 configured in accordance with an embodiment of the invention. The machine 200 includes standard components, such as a central processing unit 210 connected to input/output devices 212 via a bus 214. The input/output devices 212 may include a keyboard, mouse, touch display and the like. A network interface circuit 216 is also connected to the bus 214. The network interface circuit 216 provides connectivity to a network, which may be any combination of wired and wireless networks. A memory 220 is also connected to the bus 214. The memory 220 stores instructions executed by the central processing unit 210 to implement operations of the invention. In one embodiment, the memory 220 stores a resource exhaustion identifier 222, which includes instructions to identify DNS resource exhaustion attacks of the type described in connection with FIG. 1. The memory 220 may also store a counter-measure module 224, which includes instructions to respond to identified resource exhaustion attacks. Machine 200 may be dedicated to identifying DNS resource exhaustion attacks. Alternately, module 222 and/or module 224 may be incorporated into a recursive name server or other networked resource.

Figure 3:
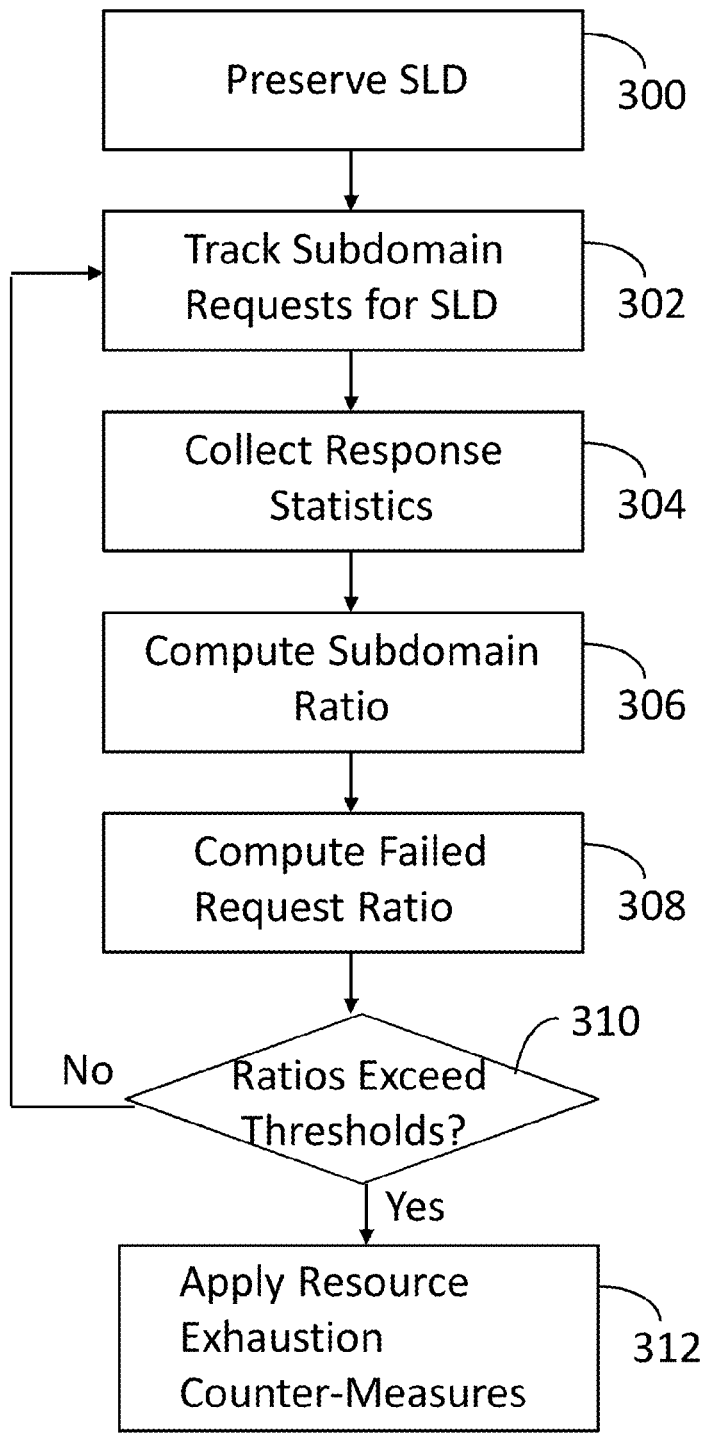
FIG. 3 illustrates processing operations associated with an embodiment of the invention.

FIG. 3 illustrates processing operations associated with an embodiment of the resource exhaustion identifier 222. Initially, a DNS request is received and a second level domain (SLD) is preserved 300. For example, an SLD of "example.com" may be preserved. A reputation entry for this SLD may also be recorded. Consider an example domain abcdefg.example.com. The SLD is example.com. The prepended subdomain abcdefg is compared against a cardinality set. If that value is already present in the cardinality set, there is no change to the cardinality set. If it is not present, then the subdomain is added to the cardinality set. Any query of the cardinality set returns a value that represents the number of unique entries in the set.

Next, the number of unique subdomain requests for the SLD is tracked 302. A sliding time window may be used in this operation. Examples of unique subdomains include abscdefg.example.com and hijklmn.example.com.

Next, response statistics are collected 304. For example, one may count the number of successful responses versus failed responses (timeouts or error). A subdomain ratio is then computed 306. The subdomain ratio may be the ratio of the number of unique subdomains versus the number of requests for the SLD. The number of unique subdomains may be obtained from the previously referenced cardinality set.

Next, a failed request ratio is computed 308. This value expresses the ratio of failed requests versus the total number of requests. The ratios are then compared to thresholds. If they exceed the thresholds (310—Yes) a resource exhaustion attack exists and resource exhaustion counter-measures are applied 312. The counter-measure module 224 may apply or invoke these measures, examples of which are provided below.

Various thresholds may be used. In the case of a threshold for a subdomain ratio, a typical subdomain ratio may be at or about 0.1. This means that of all the requests made to example.com, only 1 in 10 resulted in a new subdomain being queried. This is important because the DNS resolver infrastructure caches the response after the first query. Therefore, subsequent queries for the same subdomain just get responses from the cache and do not go out to the Internet. Unique subdomains mean cache misses and requests going out to authoritative DNS servers. This is key to the attack, since hitting the cache will not cause the resource exhaustion unless the bandwidth is saturated. In an attack the subdomain ratio may be at or about 0.7 for unique subdomains. Thus, the threshold may be set at or around 0.7.

For the failed request ratio threshold, part of the attack is that the subdomain being queried is either non-existent (no DNS record) or the DNS server is crafted to respond very slowly (e.g., 10 seconds). The recursive resolver develops a huge number of outstanding requests which will never get a response, thus running out of handles to generate new requests. Consequently, the failure ratio is an important metric based on the nature of the attack. A threshold at or around 0.6 is associated with an attack. The thresholds and ratios may be normalized between 0 and 1.

As previously indicated, the counter-measure module 224 may be used to apply or invoke counter-measures. For example, Response Policy Zone (RPZ) is a mechanism for use in DNS recursive resolvers to allow customized handling of domain name information zones.

Commercial services are available with DNS RPZ feeds to help protect against malicious domains as they begin to be reported. Such services apply counter-measures in real-time as an attack transpires. Counter-measures may include applying per-domain or per-IP rate limits or custom responses for DNS query requests from clients within a network. A time window may be used over which requests to an attacked domain are blocked from reaching the DNS resolver infrastructure for a finite period.

An embodiment of the present invention relates to a computer storage product with a non-transitory computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media, optical media, magneto-optical media and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A machine, comprising:
a processor; and
a memory connected to the processor, the memory storing instructions executed by the processor to identify a domain name system resource exhaustion attack in response to spikes in the number of unique subdomains being queried and spikes in the number of failed responses from a specified name server.

2. The machine of claim 1 wherein the memory storing instructions executed by the processor include instructions to:
preserve a second level domain,
track requests for subdomains of the second level domain,
collect response statistics,
compute a subdomain ratio,
compute a failed request ratio, and
identify the resource attack when the subdomain ratio exceeds a first threshold and the failed request ratio exceeds a second threshold.

3. The machine of claim 2 wherein the memory storing instructions executed by the processor include instructions to apply or invoke counter-measures.

4. The machine of claim 3 wherein the counter-measures include domain access restrictions.

5. The machine of claim 3 wherein the counter-measures include per-domain rate limits for lookup requests.

6. The machine of claim 3 wherein the counter-measures include invoking a Response Policy Zone.

7. The machine of claim 2 wherein the request type is used in determining threshold values.

* * * * *